United States Patent
Bienert

[11] 3,949,625
[45] Apr. 13, 1976

[54] ACTUATING MECHANISM FOR OPENABLE AUTOMOBILE ROOF PANEL

[75] Inventor: Horst Bienert, Gauting, Germany

[73] Assignee: Webasto-Werk W. Baier KG, Stockdorf, Munich, Germany

[22] Filed: July 16, 1974

[21] Appl. No.: 488,965

[30] Foreign Application Priority Data
July 18, 1973  Germany............................ 2336519

[52] U.S. Cl. ............... 74/543; 74/530; 292/DIG. 5; 296/137 H; 403/96
[51] Int. Cl............................................. G05g 1/10
[58] Field of Search ..................... 296/137 F, 137 H; 292/336.3, 150, DIG. 5; 74/548, 543, 504, 491

[56] References Cited
UNITED STATES PATENTS
2,829,538  4/1958  Mueller................................. 74/548

FOREIGN PATENTS OR APPLICATIONS
65,895  6/1950  Netherlands .................... 296/137 F
331,253  6/1930  United Kingdom ............. 296/137 F Primary Examiner—Samuel Scott
Assistant Examiner—F. D. Shoemaker
Attorney, Agent, or Firm—Joseph A. Geiger

[57] ABSTRACT

An actuating mechanism for the openable roof panel of an automobile in which a rotatable assembly consisting of a twist handle, a vertical shaft and a double-arm lever is movable axially by pulling the twist handle, thereby disengaging locking serrations on the handle and on a fixed retaining flange, a spring re-engaging the serrations, as soon as the handle is released.

8 Claims, 2 Drawing Figures

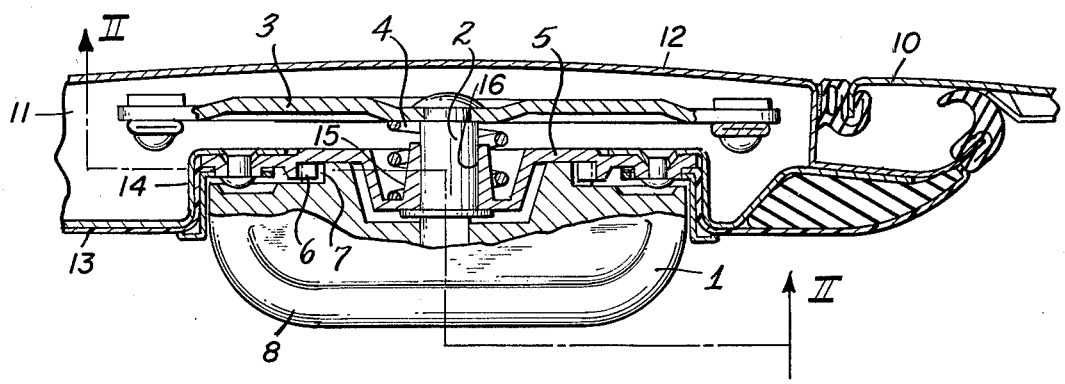
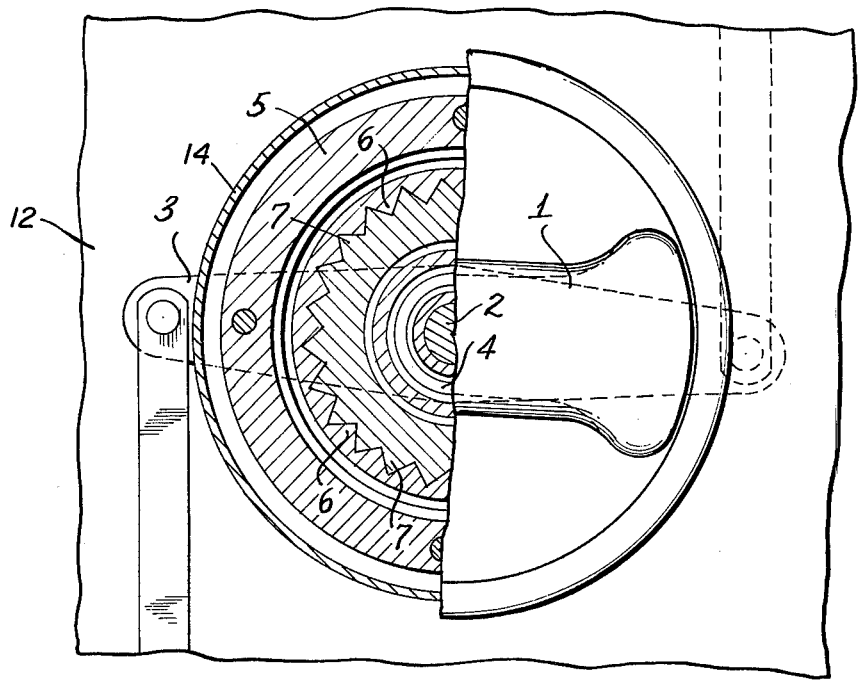

ACTUATING MECHANISM FOR OPENABLE AUTOMOBILE ROOF PANEL

BACKGROUND OF THE INVENTION

1. Field of the Invention

The present invention relates to actuating mechanisms for openable automobile roof panels, and in particular to twist handles for the manual opening of roof panels, such as sliding roof panels and roof vent panels, which are lockable and releasable by moving the handle between two end positions.

2. Description of the Prior Art

From the prior art are known various actuating mechanisms for the manual opening and closing of automobile roof panels. In most cases, these roof panels are so-called sliding roof panels, where the rear end of the openable panel can be lowered, whereupon the panel is retracted under the adjacent stationary portion of the roof. The actuating mechanism, by means of which the rear portion of the panel is lowered and raised, is frequently also combined with a clamping device which serves to lock the sliding roof panel in any desired open position.

A common shortcoming of these prior art devices is the fact that the actuating handle, which is usually rotatable between two end positions, is lockable against inadvertant movement only in one of these end positions, as a result of a self-locking dead center configuration, or the like.

SUMMARY OF THE INVENTION

It is a primary objective of the present invention to provide an acuating mechanism for roof panels in which the twist handle offers more versatile usage of the actuating mechanism, especially in conjunction with upwardly pivotable roof vent panels, replacing the more complex and therefore more costly prior art devices, such as crank-type actuating mechanisms.

The present invention proposes to attain the above objective by suggesting an actuating mechanism for openable automobile roof panels which includes a twist handle rotatable between two end positions, thereby moving the openable roof panel between a closed position and an open position, the twist handle being lockable in both end positions. Preferably, however, the twist handle is not only lockable in its two end positions, but also in various intermediate positions, in order to safely maintain the pivotable roof panel in any desired intermediate position between its open and closed positions.

In a preferred embodiment of the invention, the twist handle is part of an actuating mechanism arranged in the roof structure, the handle being accessible from underneath the roof, reaching to the inside of the roof structure via a vertical shaft, which in turn is connected to transverse actuating rods by means of a double-arm lever. The shaft to which the twist handle and the double-arm lever are attached is axially movable against a compression spring urging the twist handle upwardly against a retaining flange on the stationary roof portion. In the abutted position, the handle is angularly locked in place through cooperating serrations defined by the twist handle, on the one hand, and by the retaining flange, on the other hand.

These cooperating separations are preferably in the form of concentric teeth formations capable of locking the twist handle in any of the tooth positions defined by the non-rotatable tooth formation of the retaining flange. Thus, in order to rotate the twist handle, the latter is simply pulled downwardly against the biasing spring and rotated a certain angle, whereupon it is released, locking automatically in the nearest tooth position. This simple and fool-proof locking action has in the past been obtainable only with such self-locking devices as worm gears, spindles, threaded cables, and the like.

BRIEF DESCRIPTION OF THE DRAWINGS

Further special features and advantages of the invention will become apparent from the description following below, when taken together with the accompanying drawing which illustrates, by way of example, an embodiment of the invention, represented in the various figures as follows:

FIG. 1 shows in a vertical longitudinal cross section a roof panel actuating mechanism embodying the invention; and FIG. 2 is a plan view of the embodiment of FIG. 1, a portion thereof being a cross section along line II-II of FIG. 1.

DESCRIPTION OF THE PREFERRED EMBODIMENT

In FIGS. 1 and 2 of the drawing is shown a preferred embodiment of an actuating mechanism for openable automobile roof panels, the mechanism having a twist handle 1 attached to the lower end of a shaft 2, and a double-arm lever 3 attached to the upper end of the same shaft. To the extremities of the double-arm lever 3 are connected two transversely extending actuating rods which, as a result of the motion derived from twist handle 1, open or close the movable roof panel 10. This type of actuating rods and the connecting structure are known from the prior art, and are therefore not shown in the drawing.

The shaft 2 of the actuating mechanism is journalled inside a retaining flange 5, the latter having a bearing extension 15 with a bore 16 for this purpose. The flange 5 is fixedly attached to a recess 14 of the inner skin 13 of the stationary roof portion 11. Besides being journalled in the retaining flange 5, the rotatable assembly consisting of shaft 2, handle 1 and lever 3, is also vertically movable in relation to flange 5, a compression spring 4 biasing the assembly upwardly, so that the twist handle 1 normally abuts against the retaining flange 5. In this abutted position, the rotatable assembly is angularly locked against the retaining flange 5 of the stationary roof portion 11 by means of cooperating tooth formations or serrations, the fixed retaining flange 5 carrying female serrations 6, and the axially movable twist handle 1 carrying male serrations 7.

Thus, when the twist handle 1 is pulled downwardly against the force of spring 4, by grasping its grip portion 8, the male serrations 7 are disengaged from the female serrations 6, so that the twist handle 1 can now be rotated to a new position. As soon as the twist handle 1 is released, the compression spring 4 re-engages the serrations of handle 1 in the nearest fitting tooth position of the fixed serrations of flange 5.

Both the twist handle 1 and the retaining flange 5 may be manufactured as injection molded plastic parts, the preferred embodiment thus featuring simple and inexpensive components which are suitable for mass production. As can be seen in FIG. 1, the retaining flange 5 is riveted to the bottom of the recess 14 of the inner skin 13. The double-arm lever 3 and the attached actuating rods extend in the space between the outer skin 12 and the inner skin 13 of the stationary roof portion 11.

Obviously, the illustrated preferred configuration of male and female serrations may be replaced by other cooperating locking means such as serrations with radially extending grooves, or detent engagements of the pin-and-bore type, and others. Also, in the case of cooperating serrations, one of the cooperating parts may have only one tooth, or only a few teeth.

It should be understood, of course, that the foregoing disclosure describes only a preferred embodiment of the invention, and that it is intended to cover all changes and modifications of this example of the invention which fall within the scope of the appended claims.

I claim:

1. In a mechanism for manually actuating an openable roof panel of an automobile roof structure, such as, for example, an upwardly pivotable roof vent panel which is pivotable between a closed position and an open position, by such linkage means as a centrally located rotatable double-arm lever, or the like, with transversely reciprocatable actuating rods attached thereto, for example, the novel combination comprising:
  a retaining flange fixedly attached to the stationary roof portion;
  a shaft extending through a bearing bore in the retaining flange, the shaft carrying on one end thereof said lever;
  a twist handle attached to the other end of the shaft, so as to form a rotatable assembly with said lever;
  means for biasing the shaft in the axial direction so that the twist handle normally abuts against the retaining flange; and
  means defined by the twist handle and the retaining flange for angularly locking the twist handle against the retaining flange in their abutted position and for allowing rotation of the rotatable assembly, when the twist handle is moved axially against said biasing means, away from the retaining flange.

2. A mechanism combination as defined in claim 1, wherein
  the locking means is engageable in at least the two angular positions which correspond to said closed and open positions of the movable roof panel.

3. A mechanism combination as defined in claim 1, wherein
  the biasing means is a compression spring concentrically surrounding the shaft and axially confined between the retaining flange and the lever.

4. A mechanism combination as defined in claim 1, wherein
  the locking means includes a plurality of angularly evenly spaced recesses on one of the two parts defining the locking means, and at least one protrusion on the other part, which protrusions are adapted to engage said recesses so as to lock the twist handle in any one of several recess-determined positions.

5. A mechanism combination as defined in claim 4, wherein:
  the recesses, or female portions, of the locking means are defined by the retaining flange; and
  the protrusions, or male portions, of the locking means are defined by the twist handle.

6. A mechanism combination as defined in claim 4 wherein
  the locking means includes cooperating tooth formations defined by the retaining flange and twist handle, respectively.

7. A mechanism combination as defined in claim 6, wherein
  the tooth formations of the locking means include a circular serration on the retaining flange and a matching circular serration on the twist handle, the latter being adapted to engage the former in the manner of a spline shaft engaging a spline bore.

8. A mechanism combination as defined in claim 1, and which is adapted for incorporation in a stationary portion of the roof structure, the latter having an inner skin and an outer skin, wherein:
  the inner roof skin has a circular upwardly offset recess therein;
  the retaining flange forms at least a portion of the bottom of said recess and includes an upwardly extending bearing extension defining the bearing bore;
  the lever is arranged in the space between the inner and outer skins of the roof structure, above the recess;
  the twist handle is arranged to fit from below into the recess, having a grip portion protruding downwardly therefrom; and
  the biasing means is a compression spring centered around the bearing extension of the retaining flange and bearing upwardly against the lever, thereby biasing the twist handle upwardly into the recess, against the retaining flange.

* * * * *